United States Patent [19]

Tauern

[11] 3,852,559

[45] Dec. 3, 1974

[54] STUD WELDING APPARATUS

[75] Inventor: Dankmar Tauern, Triesenberg, Germany

[73] Assignee: Hilti Aktiengesellschaft, Fuerstentum, Liechtenstein

[22] Filed: July 12, 1973

[21] Appl. No.: 378,385

[30] Foreign Application Priority Data

July 12, 1972 Germany............................ 2234304

[52] U.S. Cl. ................................... 219/98, 219/113
[51] Int. Cl. ............................................ B23k 9/20
[58] Field of Search........ 219/98, 99, 113; 317/18 B

[56] References Cited
UNITED STATES PATENTS

| 3,423,560 | 1/1969 | Brennen............................... 219/98 |
| 3,522,409 | 8/1970 | Fay et al. ............................. 219/98 |

FOREIGN PATENTS OR APPLICATIONS 991,304   5/1965   Great Britain........................ 219/98

OTHER PUBLICATIONS

Arthur L. Phillips, Editor, Welding Handbook, Section Two, 1969, Sixth Edition, p. 30.14.

Primary Examiner—J. V. Truhe
Assistant Examiner—Clifford C. Shaw
Attorney, Agent, or Firm—Toren, McGeady and Stanger

[57] ABSTRACT

In the apparatus disclosed, a power contact interrupting the connection between a capacitor discharge device and one of two lines of different polarities that respectively carry current from the device to a stud member and a base member to be welded together, is closed regardless of which polarity of line is connected to which member, by energizing a relay with an alternating current source coupled to each line with a diode and connected to the base member through an operator-actuated trigger. The trigger forms part of the gun that holds the stud member relative to the base member for welding. When the operator actuates the trigger, the AC source attempts to pass one-half cycle of current to one line through one diode and then the other half to the other line through the other diode. The half-cycle passing through the line connected to the base member actuates the relay which closes the contacts. The device can then supply energy to the weld point between the members.

16 Claims, 2 Drawing Figures

PATENTED DEC 3 1974             3,852,559

STUD WELDING APPARATUS

BACKGROUND OF THE INVENTION

This invention relates to stud or bolt welding apparatuses, particularly for welding with direct current arcs.

In such apparatuses, a welding gun is applied to a base material in order to weld a welding element such as a bolt or stud onto the material. Typically, in arc bolt welding, such as capacitor discharge bolt or stud welding, an arc is drawn between the welding surface of the elements to be welded on so that the surfaces of both parts are melted. The element to be welded may, for example, be a welding stud or bolt, or a plate angle. The base material may, for example, be a T girder. In such capacitor discharge stud welding (CD welding) the two parts must be brought together with their surfaces in their molten state. Welding takes place after these molten surfaces meet.

Two capacitor discharge welding methods have been found to be successful because of the limited amount of energy that can be stored in a capacitor battery or bank. According to both methods, the welding bolts or studs used have a thin projecting tip projecting from one of the faces to be melted toward the other.

The tip makes it possible to provide an electric contact between the welding surface of the welding element and the surface of the base material, despite the size of the geometric distance existing between the two surfaces, so that welding current can flow and the welding arc can form. The tip is small enough so that it evaporates shortly after the welding current pulse starts, thereby forming the arc. At the same time, the welding element can be moved in the direction of the base material. Proper selection of the operating parameters allows the welding element ultimately to dip into the molten surface of the base material with its molten surface.

According to the first method, the welding stud is held with its tip contacting the base material. Spring means bias the welding stud toward the base material. Thus, after the onset of the welding current pulse and spontaneous evaporation of the tip, the spring biasing force moves the welding bolt or stud toward the base material.

According to the second method, the so-called gap method, the gun holds the welding bolt at a predetermined distance of a few millimeters from the base material before the welding process starts. To carry out the welding process, an operator turns on the welding voltage. The distance between the bolt and the base material interrupts the welding circuit. A force in the gun holding the bolt now acts to propel the welding bolt forward toward the base material, or if some means has been holding the stud back against such a force in the gun, these means are released. Thus, the gun propels the welding bolt and its holding means, which are displaceable together, toward the base material. If, during this movement, the welding bolt strikes against the base material with its tip, the circuit is closed. Welding current begins to flow and the tip evaporates spontaneously. Thus, the welding stud continues its movement without any measurable velocity difference. Here, too, evaporation of the tip forms an arc so that the above described method effects welding.

As a rule, stud welding apparatuses have a current supply and control unit as well as a welding gun connected to this unit over suitable lines. Among other things, the welding gun includes holding means for the welding stud and a trip switch or trigger for starting the welding operation.

For safety reasons, the gun is constructed so that the effective start of the welding operation in the stud welding apparatus is possible only when the welding gun is applied. This reliably protects operators from accidents when they fail to carry out the welding operation properly.

One known apparatus provides a safety release circuit containing a trip switch such as finger-operated trigger, a contact on at least one leg of the welding gun with which an electrical connection can be established to the base material, and a control element. At least one of the welding lines is arranged in the release circuit. When a current flows after release of the trip switch by the safety release circuit, the control element, for example a relay, trips and closes the welding circuit through a welding current switch. However, if the welding gun is not applied to the base material, the safety release circuit cannot be closed by actuating the trip switch. Thus, the welding operation cannot start.

Direct current operated stud welding apparatuses, and particularly capacitor discharge welding apparatuses, should be able to operate with a selected polarity for optimum results. Among other things the optimum polarity depends upon the types of materials to be welded and upon their surface qualities. An operator can interchange the polarities simply by connecting the proper welding line to the portion of the welding gun that contacts the base material. Special polarity-reversing switches can also be provided.

If the polarity of a welding line arranged in the release or actuating circuit is interchanged in a conventional stud welding apparatus which has a safety release circuit and which effects welding according to the second of the aforedescribed methods, i.e., the gap method, difficulties are encountered. While the welding stud is retracted from contacts with the base member, the gap between the stud and the base member interrupts the operation of the actuating circuit in one of the two possible poling arrangements of the lines. This prevents the welding operation from being started.

Various means have been tried to eliminate this problem with presently known systems. In one attempt, several contacts were used for establishing electrical connections with the base material. In this case, the actuating or release circuit is closed between the contacts of the gun through the base material instead of through a welding line. One disadvantage of the arrangement is that, if the surfaces are not clean, the greater number of contacts may produce contact difficulties. Another disadvantage arises from the fact that the safety which the safety release circuit is to provide can be easily eliminated by bridging the contacts. As a result, the safety release or actuating circuit has been completely eliminated, or the possibility of changing the polarity, or operation using the gap method, or the possibility of reversing the polarity of the welding lines has been abandoned.

Moreover, in such a system, special means were necessary to reverse the actuating circuit. These means require additional manufacturing expenditures, and the operator might forget to use these special means.

An object of the invention is to provide a stud welding apparatus of the above-described type with a safety actuating circuit which operates properly without additional operating means and which is capable of carrying out both of the welding methods with any polarity, and without making the safety actuating circuit technically complex.

A more general object of the invention is to improve stud welding apparatuses.

SUMMARY OF THE INVENTION

According to a feature of the invention, these objects are attained, in whole or in part, by energizing the actuating or release circuit with a current distinguishable from the welding currents so that the welding current and actuating current can easily be separated, and connecting the actuating circuit to both of the two welding lines at a point between the welding current source and the polarity-changing connectors through means that decouple the lines from each other.

According to another feature of the invention, the current energizing the release or actuating circuit is alternating current and the release circuit is connected to the lines through respective rectifiers which are poled to oppose current flow through them between the lines. The rectifiers thus couple the alternating current to the lines but decouple the lines from each other.

By virtue of these features, the actuating circuit can pass current that switches welding current into the lines through whichever line is connected to the base material. In one half-cycle of the alternating current the current attempts pass through one of the rectifiers and one of the lines and the other half-cycle through the other rectifier and the other of the lines. Thus, current passes through the line connected to the base material during at least one half-cycle. This current flow can be detected for initiating the flow of welding current from the welding current source to the stud and base material.

According to another feature of the invention, sensing means respond to the actuating current to close a switch in series with one of the lines and the source of welding current.

According to another feature of the invention, the sensing element is a relay and the switch is a contact of that relay.

According to another feature of the invention, the sensing element is a thyristor whose gate responds to the current and whose path of major current is in series with the source of welding current and the line.

According to another feature of the invention, the alternating current in the actuating circuit represents the alternating current of the mains transformed down to a suitable voltage value.

According to another feature of the invention, the current different from the welding current is in the form of pulses having positive and negative polarities.

According to another feature of the invention, a gun holds the welding element, e.g., the stud, and a retracting or holding magnet which is excited within the welding gun by actuating a switch retracts or holds the element against the force of a spring. The sensing means in the actuating circuit deactivates the magnet and allows the gun to propel the element toward the base material.

According to another feature of the invention, the sensing means in the release or actuating circuit responds only when the current in the actuating circuit is unidirectional and not bi-directional. In this way, current passing through both of the lines in response to the tip of the element unintentionally resting against the base material prevents flow of welding current. Thus, the gun can initiate the welding current only after the welding element is retracted from contact with the base material.

According to another feature of the invention, the sensing means in the actuating circuit responds only to bidirectional current.

In this way only when the tip of the element contacts the base member, as required in the contact method, does the gun ultimately trigger welding currents. Thus, the system is capable of assuring a gap or the lack of a gap as desired.

According to another feature of the invention, the sensing means is a relay to which a capacitor is connected in parallel. The capacitor thus acts as a shunt for alternating current when the gap method is to be used and the welding element accidentally contacts the base material.

According to another feature of the invention, the safety actuating circuit includes holding means for inhibiting the actuating circuit after the actuating circuit has operated and allows operation of the actuating circuit only after the welding gun has been lifted from the base material. This provides an additional safety factor. Recharge of the capacitor bank can start again only when the welding circuit is open and any thyristors forming the welding switch have had time to allow their internal charge carriers to make them non-conductive.

These and other features of the invention are pointed out in the claims. Other objects and advantages of the invention will become evident from the following detailed description when read in light of the accompanying drawings.

DETAILED DESCRIPTION OF PREFERRED EMBODIMENTS

Figure 1:
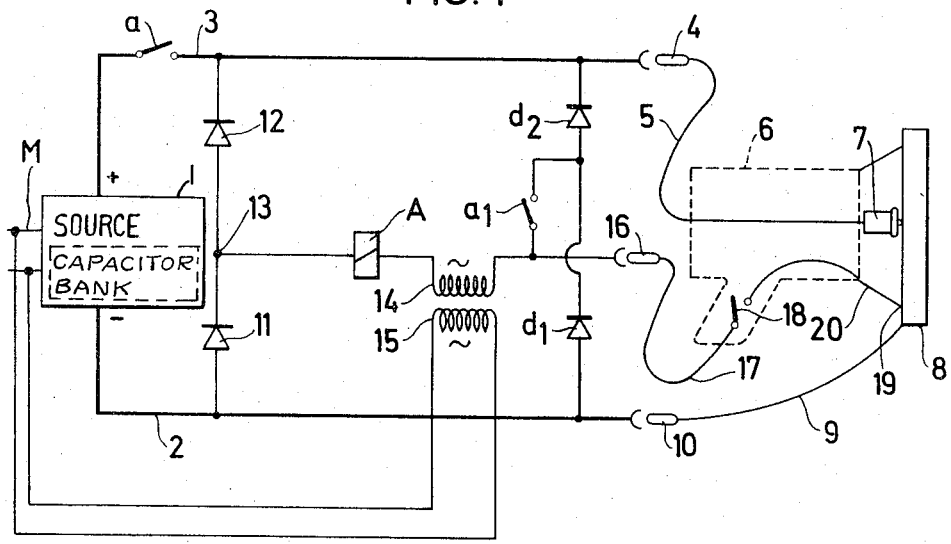
FIG. 1 is a schematic circuit diagram illustrating a welding apparatus having a safety release or actuating circuit and embodying features of the invention.

In FIG. 1, a welding energy source 1, such as a rectified current source and a capacitor battery or a welding transformer with a rectifier, receives energy from a pair of mains M. The source 1 energizes two welding lines 2 and 3 through a welding current switch a in series with the line 3. A plug connection 4 and a flexible cable 5 electrically connect a welding bolt or stud 7 mounted by a welding gun 6. The gun 6 sets the welding stud 7 either in a position in which its tip rests on a base material 8 when it is to operate according to the contact method, or in a position where it is retracted from the base 8 in order to operate according to the gap method. Suitable means, not shown, in the gun 6 retract and hold the stud 7 in the correct position. A flexible cable 9 and a plug connection 10 connect the base material 8 to the welding line 2.

During the welding process, the welding line 3 carries positive potential relative to the welding line 2.

Two series-connected diodes 11 and 12 poled to oppose current flow between the positive line 3 and the negative line 2 form a common junction 13. A relay A connected to the junction 13 forms a series circuit with a secondary winding 14 of a transformer. Alternating current from the source M feeds the primary winding 15 of the transformer.

A plug connection 16 connected in series with the secondary winding 14 and a flexible cable 17 connect to one contact of a trigger or trip switch 18 in the welding gun 6. The other contact of the trigger switch 18 is connected to a contact 19 of one of the supporting legs 20 of the welding gun. When the welding gun 6 has its supporting leg contacting or attached to the base material 8, an electrical connection is established between the contact 19 and the base material 8. For welding, the gun 6 is attached to the base material 8 with the supporting leg 20. In operation, it is assumed that the welding stud 7 rests on the base material 8 and that welding energy is available from the welding energy source 1. When the trigger switch 18 is closed, an actuating or release circuit is completed for the half waves of alternating current of one polarity from the secondary winding 14 of the transformer, through the plug connection 16, through the flexible cable 17, the switch 18, the contact 19, the electrically conductive base material 8, the flexible cable 9, the plug connection 10, the welding line 2, the diode 11, and the relay A. For half waves of alternating current with the other polarity, the actuating or release circuit is completed through the diode 12, the welding line 3, the plug connection 4, the flexible cable 5, the attached welding stud 7, the base material 8, the contact 19, the trip switch 18, the cable 17, the plug connection 16, the secondary winding 14, and the relay A. This excites the relay A and closes its contact $a$. Thus, the welding circuit is completed through lines 3, plug connection 4, cable 5, welding bolt 7, base material 8, cable 9, plug connection 10, and the welding line 2.

The two diodes 11 and 12 oppose current flow comparable to the welding currents from the line 3 to the line 2. The welding current therefore does not influence the actuating circuit. In effect, the diodes 11 and 12 decouple the welding lines from each other, decouple the welding current from the actuating circuit but couple the actuating current into the welding lines.

If the polarity of welding is to be interchanged, an operator need merely unplug the flexible cables 5 and 9 from their plug connections 4 and 10 and plug cable 9 into welding line 3 and cable 5 into welding line 2. It can readily be seen that the release or actuating circuit operates satisfactorily in this condition as well as the previously explained condition. To explain the operation using the so-called gap method, it is assumed that cable 5 is again connected to the welding line 3 and cable 9 to welding line 2. For this purpose suitable means within the welding gun 6 retract the stud 7 from its position against the base material to a position that forms a gap between the base material 8 and the stud. Suitable biasing means then tend to drive the stud 7 towards the base material.

Closing the trigger or trip switch 18 completes a path of the actuating circuit through the switch 18, contact 19, base material 8, cable 9, the plug connection 10, the diode 11, the relay A, the secondary winding 14, the plug connection 16, and the cable 17. However, the path through the welding stud 7 is interrupted because the latter is lifted from the base material. Accordingly, a pulsating direct current flows in a path of the actuating circuit. This trips relay A again. This, in turn, closes the contact $a$ and allows contact between the stud 7 and the material 8 to complete the welding circuit. Suitable means move the welding element 7 and drive it toward the material 8. The welding operation occurs as previously explained.

If cables 5 and 9 are interchanged so that cable 9 is connected to welding line 3 and cable 5 to welding line 2, the actuating circuit can again be completed by closing the switch 18. A path is then formed in the actuating circuit from the switch 18, through the contact 19, the base material 8, the cable 9, the welding line 3, the diodes 12, the relay A, and the secondary winding 14.

In FIG. 1, two series-connected diodes $d1$ and $d2$ block flow of welding current from line 3 to line 2. A second relay contact $a1$ responsive to current in the relay A connects the common point of the diodes $d1$ and $d2$ to the secondary winding 14. When the actuating circuit is closed, the circuit branch represented by the diodes $d1$, $d2$, and contact $a_1$ act as a latch for the relay A. The relay A remains latched, even after the trip switch 18 is opened until the welding gun 6 is lifted from the base material 8.

Figure 2:
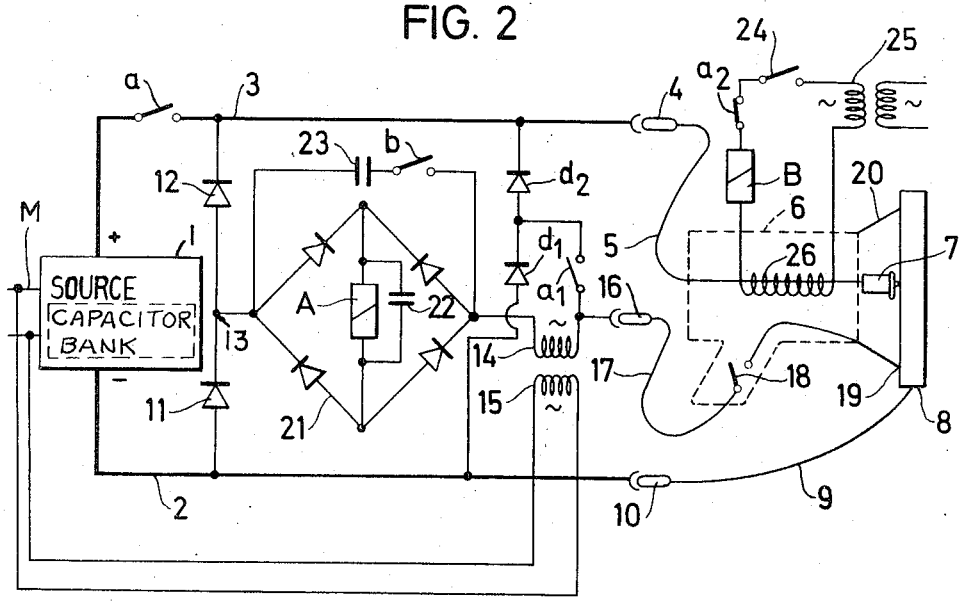
FIG. 2 is a schematic circuit diagram of another welding apparatus having another safety release circuit and embodying features of the invention.

In FIG. 2, the basic circuit with the welding energy source 1, the welding lines 2 and 3, the welding current switch $a$, the plug connections 4, 10, and 16, the cables 5, 9, and 17, the diodes 11 and 12, the transformer windings 14 and 15, and trip switch 18 correspond to the circuit shown in FIG. 1. However, in contrast to FIG. 1, the relay A is a direct current relay. The relay A forms the diagonal of a rectifier bridge 21 and a smoothing capacitor 22 for smoothing or filtering the pulsating direct current arranged parallel to the relay A. A contact $b$ connects a capacitor 23 across the other diagonal of the bridge 21.

FIG. 2 illustrates a gap-setting arrangement also suitable for the circuit of FIG. 1. Such a gap-setting circuit was omitted from FIG. 1 to facilitate understanding. The gap-setting circuit permits an operator to weld according to the gap method and positively to prevent welding with the welding bolt 7 applied to the base material 8 when the gap welding method has been selected.

In the gap-setting circuit a setting switch 24 forms a series path with a transformer 25, a magnet coil 26, a relay B and a rest contact $a2$ of the relay A. The magnet 26 retracts the welding bolt 7 by lifting it from its contact with the base material 8.

When the setting switch 24 is closed current from the transformer 25 excites the magnet coil 26 and poles the welding stud 7 and its holder back into a retracted position. According to another embodiment of the invention, the magnet 26 merely holds the bolt 7 in its retracted position after it has been pushed into its retracted position. The stud 7 is now no longer in contact with the base material 8. Suitable spring means bias the stud 7 toward the base material so that it can later be driven toward the base material. At the same time as the magnet 26 operates on the stud 7, the relay B pulls up the contact $b$ and closes it. This presets the gap welding method.

When the trip switch 18 is closed, the actuating circuit closes through the base material only by means of contact 19 in cable 9 but not through the welding bolt 7. A pulsating direct current thus flows in the actuating circuit. The capacitor 23 forms a high resistance to the DC component of this pulsating direct current. For this reason, the relay A is excited. The relay A now closes the welding circuit by means of its contact a which operates as the welding switch. The actuated relay A opens the rest contact a2 of the holding magnet circuit so that the spring in the gun drives the welding element, i.e., the stud 7, toward the base material 8.

If the welding bolt 7 rested on the base material 8, despite the closed setting switch 24, when the trip switch is closed, an alternating current would flow in the actuating circuit. The capacitor 23 would then exhibit such a lower resistance to the alternating current that it would short-circuit the rectifier circuit 21 with the relay A. The capacitor 23 would have no DC component to block. Thus the relay would not trip. Closing the welding circuit with the gap welding method preselected, and with the welding bolt resting on the base material 8, is thus impossible.

In the circuit of FIG. 2 which prevents welding with the gap welding method preselected and with the welding bolt contacting the base material, the circuit branch composed of members d2, d1, and a1 of FIG. 1 are also applicable for latching the relay A. In FIG. 2 this is again done so that the actuating process is cancelled only after the welding gun has been lifted from the base material 8. However, here relay contact a1 is connected so that it interrupts the shunt for relay A in its operating position so that the relay A can latch itself even with alternating current.

The circuit of FIG. 2 permits welding with interchanged polarity by means of both welding methods as can readily be seen.

The apparatus according to the invention can function under all four possible operating conditions, namely with both possible polarities, and with the bolt contacting the base material or gapped from the base material. On the one hand, this is achieved by using a different type of current for the release circuit that that of the welding circuit so that the two currents can easily be separated, though part of the welding current path is always used for the actuating or release circuit. On the other hand, this is accomplished by virtue of the symmetrical connection of the release circuit to the welding circuit through the rectifiers. This assures that at least one connecting path is always available for the actuating current. Each of the two possible connecting paths is conductive only for half waves of a predetermined polarity. With the welding element resting on the base material, both paths to the line are complete and the actuating circuit is closed for both half waves when the trip switch is actuated. However, if the welding element is not conductively connected with the base material after the gun has been applied, only the one connecting path is available. The actuating circuit here then is composed only of half-cycle waves in one direction. However, this is sufficient for operating the control element, namely the relay. According to another embodiment, a controlled semiconductor switching element, such as a thyristor is used. Under these circumstances the path of main current flow of the thyristor would replace the contact a. A resistor would be connected in place of the relay coil A and the gate of the thyristor connected to the end of the resistor closest to the transformer secondary 14.

Current with alternating polarity, in the simplest case, is the alternating current of the mains transformed down to an expedient voltage value. However, according to an embodiment of the invention, other currents of alternating polarity such as impulses with alternating positive and negative polarity are used.

According to one of the embodiments, the system welds with the gap method. Here the welding element, such as the welding bolt, together with its holder, is lifted from the base material even when the gun is applied to the base material. As shown, this is achieved with a retracting or holding magnet that is excited in the welding gun by an actuating switch. The welding element and its holder can be retracted by the retracting magnets into its rear position and held there. According to an embodiment of the invention, for reasons of space and weight, and in order to reduce the expenditure, the holding magnet, when excited, only holds the welding element in its retracted position after it has been withdrawn to its retracted position.

Whether a retracting magnet or a holding magnet is used, it can happen that the welding element and its holder does not move into the retracted positions despite excitation of the magnet. According to the invention, welding with the welding element resting on the base material is prevented when the gap method has been decided upon, by setting the control element, such as the relay or the thyristor so that it responds only when excited by current of non-alternating polarity.

When using the welding method with the welding element resting on the base material, the release circuit is closed with the trip switch closed, both through the welding line connected to the base material and the welding element resting on the base material through the welding line to the welding element. Therefore, a welding current flows in the actuating circuit and consequently a welding current also flows through the control element. However, if the welding element is lifted from the base material, the actuating circuit is closed only over the welding line connected to the base material though the trip switch is closed. Accordingly, only a current of half-wave pulses of one polarity can flow in the actuating circuit. This criterion makes sure that, when gap welding has been selected, the possibility of welding with the welding element contacting the base material is prevented.

According to an embodiment of the invention disclosed, the control element is in the form of a relay to which a capacitor is connected in parallel during the setting or preselection of the gap. This means that, if the stud welding apparatus is switched from the method with the welding element applied on the base material to the gap welding method, a capacitor is simultaneously connected to the relay and controlled by the switching process. The capacitor is dimensioned so that it represents an effective shunt for alternating current appearing when the stud contacts the base material. This prevents the relay from tripping and the welding operation therefore does not start. However, with the stud lifted from the base material the capacitor forms a high resistance for the DC component of the resulting direct current pulses. This trips the relay and starts the welding operation.

According to an embodiment of the invention, another connection which responds to alternating current but which responds to direct current or pulsating direct current only after switching is used in place of the relay and capacitor.

As shown, a latching circuit is included as part of the safety actuating circuit. This latching circuit is used only if capacitor discharge bank is used in the power source 1 and is composed of diodes $d1$ and $d2$ as well as the contact $a1$. The latching circuit is closed after the release circuit has been effectively actuated. The latching circuit is opened only after the welding gun has been lifted from the base material. The fact that the actuating process is cancelled automatically only after the gun has been lifted from the welding material provides an additional safety factor. Recharging of the capacitor bank can start again only when the welding circuit is opened and any thyristor used in the welding switch has had sufficient time to allow its internal charge carriers to decompose and block current flow.

The term "stud welding" is used interchangeably herein with "bolt welding" and indicates not only the welding of studs or bolts to base materials but also embraces the welding of other shapes such as plates to base materials in the manner disclosed.

The term "safety release circuit" as used herein is used in the sense of, and interchangeably with, "safety actuating circuit."

While embodiments of the invention have been described in detail, it will be obvious to those skilled in the art that the invention may be embodied otherwise without departing from its spirit and scope.

What is claimed is:

1. A stud welding apparatus for direct current welding of an elemental part to a base part, comprising a direct current source of welding energy, a pair of conductive lines of different polarity coupled to the source for carrying current from said source, welding gun means for positioning the elemental part relative to the base part so that welding can take place, connector means for reversably connecting one of said lines having one polarity to one of the parts and a second of said lines having the other polarity to the other of the parts, circuit means having a common section connected by the gun means to one of the parts and first and second portions respectively coupling said common section to each of said lines and decoupling the lines from each other for forming a current path through the one of the lines through which the connector means connects the one of the parts normally open actuable trigger means mounted in the gun means and connected in the common section for normally opening and closing the path, and switch means in one of the lines and in the common section for opening and closing one of said lines in response to flow of current in the path, said circuit means including an alternating current source in said common section for applying alternating cycles through the path.

2. An apparatus as in claim 1, wherein said first and second portions in said circuit means include diode means for coupling the common section with the respective lines and decoupling the lines from each other.

3. An apparatus as in claim 1, wherein said source of welding energy is a charged capacitor bank.

4. An apparatus as in claim 3, wherein said first and second portions in said circuit means include diode means for coupling the common section with the respective lines and decoupling the lines from each other.

5. An apparatus as in claim 1, wherein said source of welding energy includes a pair of mains, said alternating current source includes a transformer coupled to said mains.

6. An apparatus as in claim 5, wherein said first and second portions in said circuit means include diode means for coupling the common section with the respective lines and decoupling the lines from each other.

7. An apparatus as in claim 1, wherein said switch means includes sensing means in said branch for responding only to direct current components of current passing through said branch, whereby said sensing means responds only when said parts are not in contact.

8. An apparatus as in claim 7, wherein said source of welding energy is a charged capacitor bank.

9. An apparatus as in claim 8, said first and second portions in said circuit means include diode means for coupling the common section with the respective lines and decoupling the lines from each other.

10. An apparatus as in claim 7, wherein said sensing means includes a sensor and a capacitor shunting said sensor.

11. An apparatus as in claim 1, wherein said circuit means include latch means responsive to said switch means and coupling said common branch to each of said lines for decoupling the lines from each other so as to latch said switch means in operative condition until said welding gun means disconnects said circuit means from one of the parts.

12. An apparatus as in 11, wherein said first and second portions in said circuit means include diode means for coupling the common section with the respective lines and decoupling the lines from each other.

13. An apparatus as in claim 11, wherein said source of welding energy is a charged capacitor bank.

14. An apparatus as in claim 11, wherein said switch means includes sensing means in said branch for responding only to direct current components of current passing through said branch, whereby said sensing means responds only when said parts are not in contact.

15. An apparatus as in claim 14, wherein said sensing means includes a sensor and a capacitor shunting said sensor.

16. An apparatus as in claim 14, wherein said first and second portions in said circuit means include diode means for coupling the common section with the respective lines and decoupling the lines from each other.

* * * * *